US00RE47134E

(19) United States
(12) Reissued Patent
Mimeault

(10) Patent Number: US RE47,134 E
(45) Date of Reissued Patent: Nov. 20, 2018

(54) MULTIPLE-FIELD-OF-VIEW SCANNERLESS OPTICAL RANGEFINDER IN HIGH AMBIENT BACKGROUND LIGHT

(71) Applicant: LEDDARTECH INC., Québec (CA)

(72) Inventor: Yvan Mimeault, Québec (CA)

(73) Assignee: LeddarTech Inc., Quebec (CA)

(21) Appl. No.: 15/373,189

(22) Filed: Dec. 8, 2016

Related U.S. Patent Documents

Reissue of:
(64) Patent No.: 8,908,159
Issued: Dec. 9, 2014
Appl. No.: 13/105,497
Filed: May 11, 2011

(51) Int. Cl.
*G01S 7/486* (2006.01)
*G01S 17/10* (2006.01)
(Continued)

(52) U.S. Cl.
CPC ..... *G01S 7/4863* (2013.01); *G01C 3/08* (2013.01); *G01S 17/105* (2013.01); *G01S 17/42* (2013.01); *G01S 17/936* (2013.01)

(58) Field of Classification Search
CPC ..... G01C 3/08; G01S 17/105; G01S 17/42; G01S 7/4863; G01S 17/936
See application file for complete search history.

(56) References Cited

U.S. PATENT DOCUMENTS 3,680,085 A 7/1972 Del Signore
4,460,259 A * 7/1984 Greivenkamp, Jr. ... G01S 17/46 396/106
(Continued)

FOREIGN PATENT DOCUMENTS

CA 2710212 7/2009
CN 2857132 1/2007
(Continued)

OTHER PUBLICATIONS

United States Department of Transportation, Federal Highway Administration, Sensor Technology Chapter 2, Traffic Detector Handbook 2 Third Edition—vol. 1, FHWA-HRT-06-108, available at www.tfhrc.gov/its/pubs/06108/02a.htm on Sep. 16, 2009.
(Continued)

*Primary Examiner* — Jeffrey R Jastrzab
(74) *Attorney, Agent, or Firm* — Fish & Richardson P.C.

(57) ABSTRACT

A multiple-field-of-view scannerless optical rangefinder operating in pulsed Time-Of-Flight operation for use in high ambient background light is described. The rangefinder comprises an optical emitter having a LED light source and driver electronics, emitting a train of light pulses having a broad field-of-illumination (FOI); a multi-channel optical receiver (MCOR) for detecting optical return signals, an overall field-of-view (FOV) encompassing each channel instantaneous FOV, the FOI encompassing the overall FOV, the multi-channel optical receiver having analog front-end electronics; an Analog-to-Digital Converter (ADC) for receiving and converting the waveforms into digital format; a control and processing unit (CPU) for generating a pulse trigger signal, sending a synchronization trigger signal to the MCOR for starting the detection of the optical return signals, and for processing the waveforms in digital format; a data interface; wherein a peak present in any of waveforms is a signature of an object located within the instantaneous FOV.

21 Claims, 4 Drawing Sheets

(51) Int. Cl.

| | |
|---|---|
| ***G01S 17/93*** | (2006.01) |
| ***G01C 3/08*** | (2006.01) |
| ***G01S 17/42*** | (2006.01) |

(56) References Cited

U.S. PATENT DOCUMENTS 4,533,242 A * 8/1985 McLauchlan et al. ..... 356/5.07
4,634,272 A * 1/1987 Endo ..... G01S 17/42 356/141.1
4,717,862 A 1/1988 Anderson
4,808,997 A 2/1989 Barkley et al.
4,891,624 A 1/1990 Ishikawa et al.
4,928,232 A 5/1990 Gentile
5,102,218 A 4/1992 Min et al.
5,134,393 A 7/1992 Henson
5,179,286 A 1/1993 Akasu
5,270,780 A * 12/1993 Moran et al. ..... 356/5.04
5,317,311 A 5/1994 Martell et al.
5,357,331 A 10/1994 Flockencier
5,381,155 A 1/1995 Gerber
5,389,921 A 2/1995 Whitton
5,621,518 A 4/1997 Beller
5,633,629 A 5/1997 Hochstein
5,633,801 A 5/1997 Bottman
5,714,754 A 2/1998 Nicholas
5,760,686 A 6/1998 Toman
5,760,887 A 6/1998 Fink et al.
5,764,163 A 6/1998 Weldman et al.
5,777,564 A 7/1998 Jones
5,805,468 A 9/1998 Blöhbaum
5,812,249 A 9/1998 Johnson et al.
5,828,320 A 10/1998 Buck
5,838,116 A 11/1998 Katyl et al.
5,889,477 A 3/1999 Fastenrath
5,896,190 A 4/1999 Wangler et al.
5,942,753 A 8/1999 Dell
5,953,110 A * 9/1999 Burns ..... 356/5.01
5,963,127 A 10/1999 Lang et al.
5,995,900 A 11/1999 Hsiao et al.
6,044,336 A 3/2000 Marmarelis et al.
6,094,159 A 7/2000 Osterfeld et al.
6,100,539 A 8/2000 Blümcke et al.
6,104,314 A 8/2000 Jiang
6,107,942 A 8/2000 Yoo et al.
6,108,071 A * 8/2000 Landry ..... G01B 11/26 356/28
6,115,113 A 9/2000 Flockencier
6,142,702 A 11/2000 Simmons
6,147,624 A 11/2000 Clapper
6,166,645 A 12/2000 Blaney
6,259,515 B1 7/2001 Benz et al.
6,259,862 B1 7/2001 Marino et al.
6,266,609 B1 7/2001 Fastenrath
6,285,297 B1 9/2001 Ball
6,340,935 B1 1/2002 Hall
6,363,326 B1 3/2002 Scully
6,377,167 B1 4/2002 Juds et al.
6,388,565 B1 5/2002 Bernhard et al.
6,404,506 B1 6/2002 Cheng et al.
6,411,221 B2 6/2002 Horber
6,417,783 B1 7/2002 Gabler et al.
6,426,708 B1 7/2002 Trajkovic et al.
6,502,011 B2 12/2002 Haag
6,502,053 B1 12/2002 Hardin et al.
6,516,286 B1 2/2003 Aebischer et al.
6,548,967 B1 4/2003 Dowling et al.
6,556,916 B2 4/2003 Waite et al.
6,559,776 B2 5/2003 Katz
6,642,854 B2 11/2003 McMaster
6,650,250 B2 11/2003 Muraki
6,665,621 B2 12/2003 Drinkard et al.
6,674,394 B1 1/2004 Zoratti
6,753,766 B2 6/2004 Patchell
6,753,950 B2 6/2004 Morcom
6,765,495 B1 7/2004 Dunning et al.
6,771,185 B1 8/2004 Yoo et al.
6,794,831 B2 9/2004 Leeb et al.
6,825,778 B2 11/2004 Bergan et al.
6,831,576 B2 12/2004 Geiger et al.
6,836,317 B1 12/2004 Perger
6,842,231 B2 1/2005 Nourrcier et al.
6,850,156 B2 2/2005 Bloomfield et al.
6,885,311 B2 4/2005 Howard et al.
6,885,312 B1 4/2005 Kirkpatrick
6,917,307 B2 7/2005 Li
6,927,700 B1 8/2005 Quinn
6,946,974 B1 9/2005 Racunas Jr.
7,026,954 B2 4/2006 Slemmer et al.
7,049,945 B2 5/2006 Breed et al.
7,081,832 B2 7/2006 Nelson et al.
7,106,214 B2 9/2006 Jesadanont et al.
7,116,246 B2 10/2006 Winter et al.
7,119,674 B2 10/2006 Sefton
7,119,715 B2 10/2006 Orita
7,123,166 B1 10/2006 Haynes et al.
7,135,991 B2 11/2006 Slemmer et al.
7,148,813 B2 12/2006 Bauer
7,209,221 B2 4/2007 Breed et al.
7,221,271 B2 5/2007 Reime
7,221,288 B2 5/2007 Fitzgibbon et al.
7,236,102 B2 6/2007 Shimotani
7,250,605 B2 7/2007 Zhevelev et al.
7,253,747 B2 8/2007 Noguchi
7,317,384 B2 1/2008 Lefranc
7,319,777 B2 * 1/2008 Morcom ..... 382/104
7,321,317 B2 1/2008 Nath et al.
7,350,945 B2 4/2008 Albou et al.
7,352,972 B2 4/2008 Franklin
7,359,782 B2 4/2008 Breed et al.
7,378,947 B2 5/2008 Daura Luna et al.
7,405,676 B2 7/2008 Janssen
7,417,718 B2 8/2008 Wada et al.
7,426,450 B2 9/2008 Arnold et al.
7,486,204 B2 2/2009 Quintos
7,492,281 B2 2/2009 Lynam et al.
7,504,932 B2 3/2009 Bartels
7,554,652 B1 6/2009 Babin et al. ..... G01S 17/107 356/5.01
7,573,400 B2 8/2009 Arnold et al.
7,616,293 B2 11/2009 Sirota et al.
7,633,433 B2 12/2009 Behrens et al.
7,635,854 B1 12/2009 Babin
7,640,122 B2 12/2009 Levesque et al.
7,652,245 B2 1/2010 Crickmore et al.
7,688,222 B2 3/2010 Peddie et al.
7,760,111 B2 7/2010 Lynam et al.
7,764,193 B2 7/2010 Chen
7,796,081 B2 9/2010 Breed
7,808,401 B1 10/2010 Schwartz et al.
7,852,462 B2 12/2010 Breed et al.
7,855,376 B2 12/2010 Cantin et al.
7,859,432 B2 12/2010 Kim et al.
7,872,572 B2 1/2011 Harrington et al.
7,889,097 B1 2/2011 Arnold et al.
7,889,098 B1 2/2011 Arnold et al.
7,895,007 B2 2/2011 Levesque et al.
7,898,433 B2 3/2011 Roberts
7,917,320 B2 3/2011 Levesque et al.
7,933,690 B2 4/2011 Kushida et al.
7,952,491 B2 5/2011 Schwartz et al.
7,957,900 B2 6/2011 Chowdhary et al.
8,159,660 B2 * 4/2012 Mimeault et al. ..... 356/139.1
8,242,476 B2 8/2012 Mimeault et al.
2002/0005778 A1 * 1/2002 Breed et al. ..... 340/435
2002/0033884 A1 3/2002 Schurr
2002/0117340 A1 * 8/2002 Stettner ..... 180/169
2003/0154017 A1 8/2003 Ellis
2003/0189500 A1 10/2003 Lim
2004/0035620 A1 2/2004 McKeefery
2004/0051859 A1 * 3/2004 Flockencier ..... 356/4.01
2004/0083035 A1 4/2004 Ellis
2004/0118624 A1 * 6/2004 Beuhler et al. ..... 180/167
2004/0135992 A1 * 7/2004 Munro ..... 356/4.01
2005/0046597 A1 3/2005 Hutchison et al.

(56) References Cited

U.S. PATENT DOCUMENTS

| | | | | |
|---|---|---|---|---|
| 2005/0117364 | A1 | 6/2005 | Rennick et al. | |
| 2005/0187701 | A1 | 8/2005 | Baney | |
| 2005/0231384 | A1 | 10/2005 | Shimotani | |
| 2005/0232469 | A1 | 10/2005 | Schofield et al. | |
| 2005/0269481 | A1 | 12/2005 | David et al. | |
| 2005/0270175 | A1 | 12/2005 | Peddie et al. | |
| 2005/0285738 | A1 | 12/2005 | Seas et al. | |
| 2006/0033641 | A1 | 2/2006 | Jaupitre et al. | |
| 2006/0145824 | A1 | 7/2006 | Frenzel et al. | |
| 2006/0147089 | A1 | 7/2006 | Han et al. | |
| 2006/0149472 | A1 | 7/2006 | Han et al. | |
| 2006/0180670 | A1 | 8/2006 | Acosta et al. | |
| 2006/0203505 | A1 | 9/2006 | Griesinger et al. | |
| 2006/0221228 | A1 | 10/2006 | Kikuchi | |
| 2007/0018106 | A1 | 1/2007 | Zhevelev et al. | |
| 2007/0061192 | A1 | 3/2007 | Chew | |
| 2007/0091294 | A1 | 4/2007 | Hipp | |
| 2007/0096943 | A1 | 5/2007 | Arnold et al. | |
| 2007/0205918 | A1 | 9/2007 | Riesco Prieto et al. | |
| 2007/0222639 | A1 | 9/2007 | Giles et al. | |
| 2007/0228262 | A1* | 10/2007 | Cantin et al. | 250/221 |
| 2007/0255525 | A1 | 11/2007 | Lee et al. | |
| 2008/0006762 | A1 | 1/2008 | Fadell et al. | |
| 2008/0108472 | A1* | 5/2008 | Seo | F16H 3/66 475/275 |
| 2008/0172171 | A1 | 7/2008 | Kowalski | |
| 2008/0186470 | A1* | 8/2008 | Hipp | 356/5.08 |
| 2008/0309914 | A1 | 12/2008 | Cantin et al. | |
| 2009/0027185 | A1 | 1/2009 | Daura Luna | |
| 2009/0102699 | A1 | 4/2009 | Behrens et al. | |
| 2009/0243822 | A1 | 10/2009 | Hinninger et al. | |
| 2009/0251680 | A1 | 10/2009 | Farsaie | |
| 2009/0267784 | A1 | 10/2009 | Braghiroli et al. | |
| 2009/0299631 | A1 | 12/2009 | Hawes et al. | |
| 2009/0323741 | A1* | 12/2009 | Deladurantaye et al. | 372/25 |
| 2010/0066527 | A1 | 3/2010 | Liou | |
| 2010/0117812 | A1 | 5/2010 | Laubinger et al. | |
| 2010/0141765 | A1 | 6/2010 | Capello et al. | |
| 2010/0191418 | A1* | 7/2010 | Mimeault et al. | 701/36 |
| 2010/0194595 | A1 | 8/2010 | Mimeault et al. | |
| 2010/0214554 | A1* | 8/2010 | Audier et al. | 356/5.01 |
| 2010/0277713 | A1* | 11/2010 | Mimeault | 356/5.01 |
| 2010/0309024 | A1 | 12/2010 | Mimeault | |
| 2011/0006188 | A1* | 1/2011 | Lin | 250/201.1 |
| 2011/0115409 | A1 | 5/2011 | Schwartz et al. | |
| 2011/0115645 | A1 | 5/2011 | Hall et al. | |
| 2011/0134249 | A1 | 6/2011 | Wood et al. | |
| 2011/0235028 | A1* | 9/2011 | Rohrseitz | 356/229 |
| 2012/0307065 | A1* | 12/2012 | Mimeault | G08G 1/04 348/149 |

FOREIGN PATENT DOCUMENTS

| | | | |
|---|---|---|---|
| DE | 29617413 | 11/1996 | |
| DE | 19823135 | 11/1999 | |
| DE | 19921449 | 1/2001 | |
| DE | 69710579 | 8/2002 | |
| DE | 10247290 | 4/2004 | |
| DE | 19604338 | 7/2004 | |
| DE | 102004035856 | 3/2005 | |
| DE | 202005010816 | 11/2005 | |
| DE | 102006025020 | 11/2007 | |
| DE | 202008007078 | 10/2008 | |
| DE | 102007038973 | 2/2009 | |
| DE | 102009013841 | 9/2009 | |
| DE | 102004016025 | 5/2010 | |
| DE | 102008043880 | 5/2010 | |
| EP | 0318260 | 5/1989 | |
| EP | 0476562 | 3/1992 | |
| EP | 0259445 | 8/1993 | |
| EP | 0494815 | 12/1996 | |
| EP | 0838695 | 4/1998 | |
| EP | 0612049 | 9/1998 | |
| EP | 0988624 | 3/2000 | |
| EP | 0912970 | 4/2000 | |
| EP | 1034522 | 9/2000 | |
| EP | 0798684 | 1/2001 | |
| EP | 0779990 | 3/2003 | |
| EP | 0935764 | 3/2003 | |
| EP | 1296302 | 3/2003 | |
| EP | 0789342 | 6/2003 | |
| EP | 0784302 | 9/2003 | |
| EP | 0866434 | 6/2004 | |
| EP | 0834424 | 11/2004 | |
| EP | 1220181 | 8/2005 | |
| EP | 1521226 | 6/2006 | |
| EP | 1049064 | 9/2006 | |
| EP | 0904552 | 3/2007 | |
| EP | 1052143 | 7/2007 | |
| EP | 1542194 | 5/2009 | |
| EP | 1048961 | 7/2009 | |
| EP | 2106968 | 10/2009 | |
| EP | 1224632 | 12/2009 | |
| EP | 2136550 | 12/2009 | |
| EP | 1435036 | 1/2010 | |
| EP | 1611458 | 4/2010 | |
| EP | 1997090 | 9/2010 | |
| EP | 1859990 | 4/2011 | |
| FR | 2690519 | 10/1993 | |
| FR | 2743150 | 7/1997 | |
| FR | 2743151 | 7/1997 | |
| FR | 2749670 | 12/1997 | |
| FR | 2910408 | 6/2008 | |
| GB | 2264411 | 8/1993 | |
| GB | 2311265 | 9/1997 | |
| GB | 2354898 | 7/2003 | |
| GB | 2369737 | 2/2005 | |
| GB | 2399968 | 2/2005 | |
| GB | 2431498 | 4/2007 | |
| GB | 2445767 | 7/2008 | |
| JP | 2059608 | 2/1990 | |
| JP | 2002059608 | 2/1990 | |
| JP | 0414390 | 5/1992 | |
| JP | 04145391 | 5/1992 | |
| JP | 09178786 | 7/1997 | |
| JP | 2004102889 | 4/2004 | |
| JP | 2005-170184 | 6/2005 | |
| JP | 2006021720 | 1/2006 | |
| JP | 2006507180 | 3/2006 | |
| JP | 2006172210 | 6/2006 | |
| JP | 2006258598 | 9/2006 | |
| JP | 2006521536 | 9/2006 | |
| JP | 2007121116 | 5/2007 | |
| WO | 8705138 | 8/1987 | |
| WO | 9203808 | 3/1992 | |
| WO | 9634252 | 10/1996 | |
| WO | 9904378 | 1/1999 | |
| WO | 0139153 | 5/2001 | |
| WO | 0185491 | 11/2001 | |
| WO | 0215334 | 2/2002 | |
| WO | 0007269 | 1/2003 | |
| WO | 03000520 | 1/2003 | |
| WO | 2004010402 | 1/2004 | |
| WO | 2004027451 | 4/2004 | |
| WO | 2004036244 | 4/2004 | |
| WO | 2004100103 | 11/2004 | |
| WO | 2005008271 | 1/2005 | |
| WO | 2006031220 | 3/2006 | |
| WO | 2006044758 | 4/2006 | |
| WO | 2006082502 | 8/2006 | |
| WO | 2006092659 | 9/2006 | |
| WO | 2007005942 | 1/2007 | |
| WO | 2007071032 | 6/2007 | |
| WO | 2007096814 | 8/2007 | |
| WO | 2008037049 | 4/2008 | |
| WO | 2008121648 | 10/2008 | |
| WO | 2008154736 | 12/2008 | |
| WO | 2008154737 | 12/2008 | |
| WO | 2009013739 | 1/2009 | |
| WO | 2009087536 | 7/2009 | |
| WO | WO 2009079789 A1 * | 7/2009 | G01S 7/487 |
| WO | 2009-104955 | 8/2009 | |
| WO | 2009117197 | 9/2009 | |

(56) References Cited

FOREIGN PATENT DOCUMENTS

| | | |
|---|---|---|
| WO | 2010033024 | 3/2010 |
| WO | 2010057697 | 5/2010 |
| WO | 2010069002 | 6/2010 |
| WO | 2010122284 | 10/2010 |
| WO | 2010144349 | 12/2010 |
| WO | 2011015817 | 2/2011 |
| WO | 2011025563 | 3/2011 |
| WO | 2011055259 | 5/2011 |
| WO | 2011077400 | 6/2011 |

OTHER PUBLICATIONS

The Vehicle Detector Cleaninghouse, A Summary of Vehicle Detection and Surveillance Technologies used in Intelligent Transportation Systems, Nov. 30, 2000, available at http://www.fhwa.dot.gov/environment/airtoxicmsat/4.htm on Sep. 16, 2009.

United States Department of Transportation, Federal Highway Administration, Department of Environment, Air Quality, Air Toxic MSAT, Monitoring Methods available at http://www.fhwa.dot.gov/ohim/tvtw/vdstits.pdf on Jul. 3, 2007.

United States Department of Transportation, Research and Innovative Technology Adminstration, 5.3. Infrared Detectors, available at http://ntl.bts.gov/DOCS/96100/ch05/body_ch05_03.html on Sep. 16, 2009.

Kon Tayfun, Thesis. Collision Warning and Avoidance System for Crest Vertical Curves, Virginia Tech, May 4, 1998, Appendix B2, pp. 51-52, published on Digital Library and Archives, University Libraries ofVirginia Tech, available at http://scholar.lib.vt.edu/theses/available/etd-43098-201311/unrestricted/APPENDIX-B2.PDF on Sep. 16, 2009.

Lawrence A. Klein, Vehicle Detector Technologies for Traffic Management Applications. Part 1, Colorado Department of Transportation, Intelligent Transportation Systems (ITS), 1997, available at http://www.cotrip.org/its/ITS%20Guidelines%20Web%20New%20Forms%202-05/Web%20Solutions%20Packages/ITS%20Solulion%20Packages%20-%20Web%20Copy/Vehicle%20Detectors/Klein%20Part%201%20Vehicle%20Detectors%20Technologies, doc on Sep. 16, 2009.

Hussain, Tarik Mustafa, City University of New-York, Infrared Vehicle Sensor for Traffic Control, Thesis (PHD) City University of New York, Dissertation Abstracts International, vol. 55-07. Section A, p. 2176, 1994, available at http://adsabs.harvard.edu/labs/1994PhDT 85H on Sep. 16, 2009.

Dimitri Loukakos, Active Laser infrared Detectors. Intelligent Transportation Systems. Traffic Surveillance, California Center for Innovative Transportation at the University of California, Dec. 20, 2001, available at http://www.calccit.org/itsdecision/serv_and_tech/Traffic_Surveillance/road-based/roadside/other_roadside_rep.html on Sep. 16, 2009.

GENEQ Inc., Passive Infrared Detector for Traffic Data Acquisition, Model IR 250, Department of Meteorology. available at http://www.geneq.com/catalog/en/ir250.html on Sep. 16, 2009.

The Vehicule Detector Clearinghouse, "A Summary of Vehicle Detection and Surveillance Technologies used in Intelligent Transportation Systems", Fall 2000, Southwest Technology Development Institute (SWTDI) at New Mexico State University (NMSU). sponsored in cooperation with the U.S. Department of Transportation FHWA, available at http://www.fhwa.dot.gov/ohim/tvtw/vdstits.

U.S. Department of Transportation Federal Highway Administration, "Detailed Moniloring Protocol 4.0 Monitoring Methods", Department of Air Quality, Air Toxic MSAT, available at http://www.fhwa.dot.gov/environment/air_quality/air_toxics/research_and_analysis/near_road_study/protocol/protocol04.cfm.

Tayfun Kon, Thesis, "Collision Warning and Avoidance System for Crest Vertical Curves", Virginia Tech, May 4, 1998, Appendix 82, pp. 51-92. published on Digital Library and Archives, University Libraries of Virginia Tech, VA.

Akindinov et al., "Detection of Light Pulses Using an Avalanche-Photodiode Array with a Metal-Resistor-Semiconductor Structure", Instruments and Experimental Techniques. Nov. 2004, vol. 48, No. 3 205, pp. 355-363, Russia.

Braun et al., "Nanosecond transient electroluminescence from polymer lightemitting diodes", Applied Physics Letters Dec. 1992, vol. 61, No. 26, pp. 3092-3094, California.

* cited by examiner

MULTIPLE-FIELD-OF-VIEW SCANNERLESS OPTICAL RANGEFINDER IN HIGH AMBIENT BACKGROUND LIGHT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This application is a reissue application based on U.S. application Ser. No. 13/105,497 filed on May 11, 2011, which previously issued as U.S. Pat. No. 8,908,159.*

TECHNICAL FIELD

The present invention relates to an optical rangefinder system and method for use in various types of detection systems, and more particularly to a scannerless instrument for angularly-resolved detection and ranging of nearby objects and obstacles over a wide field of view which can operate in many light conditions including in full daylight.

BACKGROUND OF THE ART

Optical rangefinder instruments utilize either visible or invisible light for measuring the distance to a remote object. Over the years, these instruments have found their place in a host of applications, in particular in automotive and transportation applications where, for example, they are integrated in various types of active systems intended to assist vehicle drivers and to promote a higher safety on the road. Most optical rangefinders that range objects located beyond a few meters away operate according to the time-of-flight (TOF) principle, which relies on the finite propagation speed of light. The TOF principle comes in various forms, including pulsed TOF, amplitude-modulation TOF, and frequency-modulation TOF techniques. In the pulsed TOF technique, a light source enclosed within the rangefinder emits a train of light pulses of very short duration. A part of the optical energy carried by each pulse is reflected by the aimed object to return back to the collecting aperture of the optical receiver of the rangefinder. Knowing the velocity of light in the air, the distance that separates the aimed object from the rangefinder is inferred from the time taken by the light pulses to propagate up to the aimed object and then back to the rangefinder. This time delay is usually measured by an electronic counter combined with peak detection and threshold comparator circuitry. The development of optical rangefinders benefited from ongoing efforts fueled by a strong demand for consumer-grade, compact products available at low cost and intended for ranging objects distanced from up to a few hundreds meters. As a result, the basic design of these rangefinder instruments now revolves around compact assemblies that typically comprise a laser diode transmitter emitting laser pulses with a duration of 5 to 50 ns (nanoseconds) at a near-infrared wavelength, an optical receiver including either a photodiode (typically an Avalanche PhotoDiode (APD)), amplifiers, automatic gain control (AGC) and timing discriminators. Further details about laser ranging principles can be found in M-C. Amann et al., "Laser ranging: a critical review of usual techniques for distance measurement", (Optical Engineering, Vol. 40, No. 1, pp. 10-19, 2001).

The light pulses emitted from typical laser rangefinders can propagate over long distances while maintaining a very small transverse beam size typically in one Field Of View (FOV). This high-directional character of laser beams is of great usefulness for performing angularly-resolved detection and ranging of objects when combined with an angular scan of the aiming direction of the rangefinder. The small beam size results from the distinctive nature of laser light, in particular its high spatial and temporal coherences along with the availability of laser sources capable of radiating single-longitudinal and single-transverse mode laser beams. These factors combine to allow optical collimation of the laser light pulses in the form of a beam of very low divergence (angular spread), the collimation being designed using simple, off-the-shelf optics. The emission of highly-directional laser beams from optical rangefinders finds its best use when the laser light reflected by the aimed objects is detected with an optical receiver that senses over a narrow FOV. The FOV of an optical receiver is given by the ratio of the size of the photosensitive surface of the photodetector integrated in the receiver and the focal length of the objective lens, the photosensitive surface being placed close to or exactly at the focal plane of the lens. In fact, optimum performances are generally obtained when matching the FOV of the optical receiver with the divergence angle of the emitted light pulses. In practice, the FOV of typical rangefinders does not exceed a few mrads (milliradians), mainly because of the quite small surface areas (typically in the range of 50 to 200 μm diameter) of commonly-available APDs along with the need for compact designs that command the use of objective lenses with focal lengths that do not exceed a few centimeters.

The APDs have become increasingly popular for integration in the optical receiver of laser rangefinders in such a way that rangefinders based on PIN photodiodes are now rarely encountered. Both PIN and APD photodiodes have sufficient bandwidth to detect optical pulse returns having durations in the ns range, and they can be made up of silicon for maximizing their quantum efficiency at near-infrared wavelengths lower than 1 μm. As compared to their PIN counterparts, APDs provide higher sensitivity and responsivity (up to 200×), owing to an avalanche multiplication process that enables the generation of multiple electron-hole pairs from the absorption of a single photon of light. In their analog (linear) regime of operation, APDs are reversely biased with a voltage slightly below their breakdown voltage to give an output photocurrent proportional to the light power that falls onto their photosensitive surface and to the gain applied. APDs then incorporate a gain mechanism internal to their structure, the gain factor being typically in the range of 50 to 200. However, one should note that the signal-to-noise ratio (SNR) of an APD first increases with the gain until reaching a peak value (optimum gain). The SNR then decreases with further gain due an excess noise factor intrinsic to the avalanche multiplication process. Although the higher detection sensitivity of APDs is fully exploited for optical detection in very low light level conditions, it is generally difficult to fully benefit from the advantages of APDs in rangefinder instruments intended for outdoor use in daytime conditions, for example in presence of bright sunlight. In these conditions, the optical receiver captures a strong solar background signal which competes with the useful optical signal returned from the aimed object.

As reported in U.S. Pat. No. 7,508,497, background light is typically the largest source of noise during daylight operation of laser rangefinders.

An effective approach to make laser rangefinders more immune to the presence of intense background light is mentioned for example in U.S. Pat. Nos. 5,241,315 and 7,741,618. The approach includes two basic steps. The first step is to keep the FOV of the optical receiver as narrow as possible since the amount of background light collected by an optical receiver is proportional to its FOV, as shown for example in Eq. (2.10) of R. W. Byren, Laser Rangefinders, Chapter 2 of The infrared and electro-optical systems handbook Vol. 6, Active electro-optical systems, (SPIE Press, Bellingham, Wash., 1993). In turn, the second step consists in inserting a narrowband optical filter in front of the objective lens of the optical receiver. Interference optical filters having a bandpass of less than 10 nm are currently used in laser instruments intended for outdoor use and, by themselves, these filters also call for severely restricting the FOV of the optical receiver. This restriction comes from the fact that the center wavelength or the filter bandpass drifts significantly as the incoming light is captured at incidence angles way off the receiver optical axis. In addition, undue blocking of the useful return optical signal is prevented by ensuring that the wavelength spectrum of the emitted laser pulses remains narrower than the bandpass of the interference filter while its center wavelength coincides with that of the filter bandpass.

The basic configuration of optical rangefinder instruments has been subjected to various adaptations for use in applications related to vehicle safety and transportations. Nowadays, active optical sensing and rangefinder instruments are available for safety and driver assistance systems intended for adaptive cruise control (ACC), collision avoidance, pre-crash mitigation, blind spot detection, and parking assistance, just to name a few. Although these applications have their own constraints and requirements, they all share some common requirements. For example, these applications call for real-time, reliable detection and ranging of remote objects having a varying reflectance and located at distances of a few meters up to about 100 m. Furthermore, as discussed for example in U.S. Pat. No. 6,377,167, these applications require instruments capable of operating under a wide range of ambient lighting conditions, spanning from pitch-dark nighttime to bright sunlight when embarked in a vehicle. The present car safety applications also require instruments capable of optically sensing over a wide FOV, which can reach several tens of degrees along the horizontal direction. It is clear that this latter requirement cannot be fulfilled by directly integrating, without major modifications, the narrow-FOV optical rangefinders discussed in the preceding paragraphs.

A number of strategies have been envisioned for adapting optical rangefinder instruments for use in the various car safety applications mentioned above. For example, a wide FOV along the horizontal direction can be swept in a periodic fashion by mounting an otherwise standard optical rangefinder (having a narrow FOV) on a mechanical single-axis scanner device. This popular, yet simple approach provides large angular coverage while making an efficient use of the laser light radiated by the instrument. Apparatuses and methods relying on scanning devices and intended for various vehicle safety applications are taught for example in U.S. Pat. Nos. 5,249,157, 5,293,162, 5,604,580, 5,625,447, 5,754,099, 5,757,501, 6,317,202, 6,937,375 and 7,187,445. Unfortunately, this approach has some major pitfalls. Indeed, it is based on mechanical hardware that is expensive and often too bulky for widespread use in most car vehicles since it requires a rugged, long-life angular scanner assembly capable of withstanding the shock and vibration levels encountered during normal use of a car vehicle. Also, the narrow vertical FOV of typical scanner has poor performance for example when some sections of the surface of object are specular.

As reported in U.S. Pat. No. 7,532,311, the problems related to the use of mechanical scanner devices can be alleviated by developing non-mechanical scanning (NMS) techniques. These techniques include micro-electro-mechanical system (MEMS) devices, liquid crystals, and acousto-optical devices. Unfortunately, the development of NMS-based devices affordable enough for integration in car vehicles is still at its infant stage and faces serious difficulties related to the fact that both the emitted laser light and the optical axis of the optical receiver must be scanned together in perfect synchronism.

In addition to the techniques based on mechanical scanning devices, some other approaches allow for optical sensing with a wide angular coverage while not requiring any scanning. A first approach consists in combining a light emitter designed for illuminating over a large angular extent (also referred to as a Field Of Illumination (FOI)) with an optical receiver having a wide FOV. Both the light emitter and the optical receiver point in a specific, well chosen common direction (line of sight) determined by the nature of the intended application. The center position of the field of illumination is for example made coincident with the center position of the FOV of the optical receiver in such a manner that an object located anywhere within the FOV can be illuminated by a part of the emitted light. In most cases, the outer peripheries of the field of illumination and of the FOV would have their longest extensions along the horizontal direction, while remaining relatively narrow along the vertical. Although laser sources can certainly be used for flooding light over a wide field of illumination, this choice may be found to be expensive since the spreading of the laser light over a large angular extent calls for laser sources capable of emitting light pulses carrying high optical energy or, equivalently, high peak power. Stacked laser diode arrays fabricated by stacking a number of laser bars in a common substrate are for example well suited for providing high peak laser power over a wide field of illumination, but they still remain too costly for widespread use in car vehicles.

The FOV of the optical receiver can be widened by placing a photodetector with a larger photosensitive surface at the focal plane of an objective lens having a short effective focal length. Photosensitive surfaces with an elongated, rectangular shape are preferred for sensing over a FOV that extends along a given direction while remaining very narrow along the orthogonal direction. Although the use of a single photodetector impacts favorably on the costs of optical sensing instruments, it cannot really be envisioned in most applications because no angular resolution is provided within the FOV. Indeed, in addition to ranging objects present within the FOV, most applications call for determining, at least approximately, the angular positions of the objects relative to a reference direction Likewise, the ability to evaluate the approximate projected size and shape of the ranged objects provides a further key advantage for many applications by allowing classification of the detected objects, i.e., determining if they are cars, sport utility vehicles, heavy trucks, motorcycles, bicycles, pedestrians, masts, environmental particles, pavements, walls, etc.

A simple way of enabling angularly-resolved optical ranging of objects within a full FOV of sizeable extent is to split the full FOV into a set of contiguous, smaller FOVs through the use of multiple photodetectors disposed side-by-side in the focal plane of an objective lens. Each individual photodetector then has its own FOV, which, in this case, is generally referred to as the Instantaneous FOV (shortened hereinafter as IFOV), with the center angular position of any given IFOV determined by the transverse spacing between the center position of the corresponding photosensitive surface and the optical axis of the objective lens. The photodetectors just need to be disposed along a line to enable optical sensing over a whole FOV that spreads along a single direction. Linear arrays of photodetectors are then preferred as sensing devices in these scannerless, multiple-FOV optical sensing configurations.

As an illustrative example, U.S. Pat. No. 4,634,272 teaches an exemplary embodiment of such an optical sensing instrument for ranging objects in front of a vehicle. An array of three photodetectors is disclosed, with a mention that the number of photoelements can be increased for determination of the sizes and shapes of the objects to be sensed. In practice, an instrument based on the invention taught in the above-cited patent would require very sensitive photoelements because the objects within the FOV are ranged using the standard, analog method wherein an electronic counter is stopped as soon as a first pulse return is detected. As noted previously, highly-sensitive photoelements such as APDs are difficult to operate in outdoor settings due to the intense parasitic background light that is captured during daytime, for example when sensing over wide FOVs. Furthermore, this analog method does not allow discrimination (separate detection) of more than a single object that could be present within the IFOV of any given photoelement when these objects would be at different ranges.

Another example is given by U.S. Pat. No. 6,404,506 to Cheng et al., which teaches a non-intrusive laser ranging instrument comprising a 25-element linear array of APDs for detecting objects moving across a planar surface. The instrument is placed above a portion of a road and it is intended for traffic monitoring applications by measuring the travel time of vehicles that pass through the FOV of the instrument.

As compared to optical sensing instruments relying on scanning devices, the scannerless multiple-FOV instruments briefly described herein lend themselves to highly-integrated optical sensing solutions for automotive applications, owing to the use of very compact and robust linear arrays of photodetectors. The full set of IFOVs can be sensed in parallel, in a simultaneous fashion, by coupling the outputs of the photodetector linear array to suitable multi-channel amplifying electronics and signal/data processing means. The scannerless, multiple-FOV optical sensing instruments provide timely detection and ranging of objects entering in the full FOV of the instrument while classification of the detected objects is made possible by using a linear photodetector array made up of a large number of photoelements with small photosensitive surfaces. Linear arrays comprising various numbers of highly-sensitive APDs are currently available on the market, but these components get very expensive for integration in car vehicles as the number of photoelements increases. Using a linear array with a lower number of photoelements, each having a wider photosensitive surface, is more cost-efficient, but APDs with larger surfaces are still expensive. More importantly, the operation of APDs of larger diameter is plagued by a stronger capture of background light, and this often rules out their integration in systems intended for use in widely-varying ambient lighting conditions. The optical suppression of a large part of the extraneous background light with the help of a narrow bandpass interference filter does not work in a satisfactory manner in systems that must sense over wide FOVs.

There is a need, in the industry, for a scannerless, multiple-field-of-view optical rangefinder instrument adapted for low-cost integration and that can operate under a wide range of ambient lighting conditions, and for example under bright sunlight.

SUMMARY

According to one broad aspect of the present invention, there is provided a multiple-field-of-view scannerless optical rangefinder operating in pulsed Time-Of-Flight operation for use in high ambient background light. The rangefinder comprises an optical emitter having a LED light source and driver electronics, emitting a train of light pulses having a broad field-of-illumination (FOI); a multi-channel optical receiver (MCOR) for detecting optical return signals, an overall field-of-view (FOV) encompassing each channel instantaneous FOV, the FOI encompassing the overall FOV, the multi-channel optical receiver having analog front-end electronics; an Analog-to-Digital Converter (ADC) for receiving and converting the waveforms into digital format; a control and processing unit (CPU) for generating a pulse trigger signal, sending a synchronization trigger signal to the MCOR for starting the detection of the optical return signals, and for processing the waveforms in digital format; a data interface; wherein a peak present in any of waveforms is a signature of an object located within the instantaneous FOV.

According to another broad aspect of the present invention, there is provided a multiple-field-of-view scannerless optical rangefinder operating in pulsed Time-Of-Flight operation for use in high ambient background light. The rangefinder comprises an optical emitter for emitting a train of very brief light pulses, the train of light pulses having a broad field-of-illumination (FOI), the optical emitter having a LED light source and driver electronics; a multi-channel optical receiver (MCOR) for detecting optical return signals, each detection channel of the multi-channel optical receiver having a photodetector with a photosensitive surface, an instantaneous field of view of each the detection channel having a horizontal and a vertical extent determined by dimensions of each respective the photosensitive surface and being adapted to output a channel return signal waveform, an overall field-of-view (FOV) of the multi-channel optical receiver encompassing each the instantaneous field of view, the field-of-illumination encompassing the overall field-of-view, the multi-channel optical receiver having analog front-end electronics for conditioning the channel return signal waveforms, the MCOR outputting conditioned channel return signal waveforms; an Analog-to-Digital Converter (ADC) for receiving and converting the conditioned channel return signal waveforms from the MCOR into digital format; a control and processing unit (CPU) operatively connected to the optical emitter, the MCOR and the ADC, for generating a pulse trigger signal to trigger the optical emitter into emitting the train of pulses, for sending a synchronization trigger signal to the MCOR for starting the detection of the optical return signals, and for processing the conditioned channel return signal waveforms in digital format; a data interface for receiving processed channel return signal waveforms from the CPU and preparing output data; wherein a peak present in any of the optical return signal waveforms is a signature of an object located within the instantaneous field of view.

In one embodiment, the pulses have a duration below 50 ns and a detection bandwidth of the MCOR is higher than 10 MHz.

In one embodiment, the LED light source includes a plurality of LED sources.

In one embodiment, the light pulses are in one of a near-infrared region and a visible region of electromagnetic spectrum.

In one embodiment, the optical emitter further comprises at least one of a collimating lens assembly, a lenticular lens sheet, a LED reflector and an optical diffuser to condition the light pulses emitted by the LED light source.

In one embodiment, the MCOR includes an array of PIN photodiodes.

In one embodiment, the photosensitive surface has an area of at least 0.5 $mm^2$.

In one embodiment, the photosensitive surface has a reverse saturation current greater than 1 mA.

In one embodiment, the MCOR further comprises an objective having at least one of at least one lens element, at least one mirror and at least one correcting plate, the objective for focusing the optical return signal onto the photosensitive surfaces of the photodetectors.

In one embodiment, the analog front-end electronics being at least one of parallel multi-channel and multi-channel time-multiplexed.

In one embodiment, Analog-to-Digital Converter (ADC) includes more than one converter units adapted to work together to receive and convert the conditioned channel return signal waveforms into digital format.

In one embodiment, the MCOR is composed of one of a linear arrangement of N detection channels extending along a first direction and a two-dimensional arrangement of M×N detection channels extending along both the first direction and an orthogonal direction, the orthogonal direction being orthogonal to the first direction.

In one embodiment, the detection channels are AC coupled.

In one embodiment, the range finder further comprises an optical filter for blocking at least a portion of parasitic background light having a wavelength spectrum outside of a wavelength band of the optical emitter.

In one embodiment, the LED emitter, the multi-channel optical receiver, the analog-to-digital converter and the control and processing unit are provided in an enclosure with a light transmission window for the LED emitter and the multi-channel optical receiver.

In one embodiment, the rangefinder further comprising an optical filter provided on the window for blocking at least a portion of parasitic background light having a wavelength spectrum outside of a wavelength band of the optical emitter.

In one embodiment, the optical filter is one of an optical protection window having one face coated with an optical film and a protection window made from a material allowing wavelength-selective optical transmission;

In one embodiment, the MCOR is provided on an integrated circuit.

In one embodiment, a scene spectral irradiance of the high ambient background light is higher than 50 $W/m^2$.

In one embodiment, the object is one of a vehicle, a person, an animal, a gas, a liquid, a particle, a pavement, a wall, a post, a sidewalk, a ground surface and a tree.

Throughout this specification, the term "non-visible" is intended to be a synonym of the terms "invisible" and "non-visible" and to be an antonym to the word "visible". It should be understood that "visible light" refers to light emitted at wavelengths which are visible to the human eye. Similarly, "invisible light" refers to light emitted at wavelengths which are not visible to the human eye.

Throughout this specification, the term "vehicle" is intended to include any movable means of transportation for cargo, humans and animals, not necessarily restricted to ground transportation, including wheeled and unwheeled vehicles, such as, for example, a truck, a bus, a boat, a subway car, a train wagon, an aerial tramway car, a ski lift, a plane, a car, a motorcycle, a tricycle, a bicycle, a Segway™, a carriage, a wheelbarrow, a stroller, etc.

Throughout this specification, the term "environmental particle" is intended to include any particle detectable in the air or on the ground and which is typically caused by an environmental, chemical or natural phenomenon. It includes fog, rain, snow, smoke, gas, smog, black ice, hail, etc.

Throughout this specification, the term "object" is intended to include a moving object and a stationary object. For example, it can be a vehicle, an environmental particle, a person, a passenger, an animal, a gas, a liquid, a particle such as dust, a pavement, a wall, a post, a sidewalk, a ground surface, a tree, etc.

Throughout this specification, the term "wide" is intended to be the opposite of "narrow". The terms "narrow" and "wide" refer to sizes of the field-of-illumination, field-of-view, band, channel and environment. They are intended to describe a measurement in any 3D direction, namely in width, height or length, depending on the orientation of the LED light source and of the optical detector.

BRIEF DESCRIPTION OF THE DRAWINGS

The accompanying drawings, which are included to provide a better understanding of the main aspects of the invention and are incorporated in and constitute a part of this specification, illustrate embodiments of the invention and together with the description serve to explain the principles of the invention. The accompanying drawings are not intended to be drawn to scale. In the drawings.

DETAILED DESCRIPTION

Reference will now be made in detail to the example embodiments of the invention. This invention may, however, be embodied in many different forms and should not be construed as limited to the embodiments set forth in the following description.

Overview of the Optical Rangefinder Configuration

Figure 1:
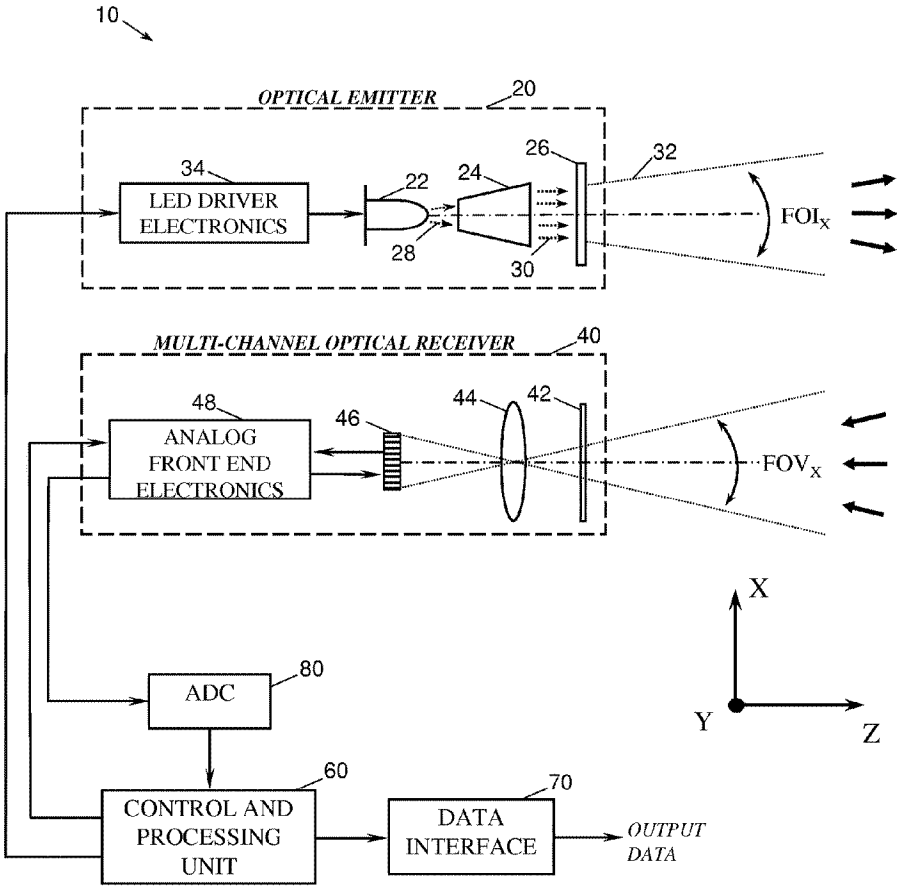
FIG. 1 is a schematic diagram illustrating the general layout and the key components that form part of an optical rangefinder instrument according to an example embodiment of the present invention.

The general layout and key components/subsystems of a multiple-FOV scannerless optical rangefinder 10 according to an example embodiment of the present invention can be better appreciated by referring to the schematic diagram of FIG. 1. The optical rangefinder 10, which operates according to the pulsed TOF principle, comprises an optical emitter 20 that emits trains of optical pulses having predetermined temporal and spatial characteristics. It also includes a multi-channel optical receiver (shortened as MCOR) 40 for detection of the optical return signals and their subsequent conversion into electrical waveforms. Each detection channel of the MCOR 40 outputs return signal waveforms that could contain at least one peak that stands out from noise. A return signal waveform is obtained after the emission of each light pulse by the optical emitter 20, but it may happen that the waveform carries no useful information at a given moment. On the other hand, each peak present in a return signal waveform is a signature of an object currently located within the instantaneous field of view (IFOV) associated to the corresponding detection channel. Several consecutive channels may generate waveforms containing exactly the same signature (also referred to as a pulse echo) when, for example, a large object is ranged (ex.: wall) or when an object gets in close proximity of the instrument. According to the pulsed TOF principle, the exact position (timing) of a signature in a return signal waveform is indicative of the range to the object, while its relative amplitude depends on both range and optical reflectance of the object at the emission wavelength of the optical emitter 20. FIG. 1 also shows that the output of the MCOR 40 connect to a control and processing unit (CPU) 60 that performs further processing of the return signal waveforms (after they have been converted into digital format by the Analog-to-Digital Converter (ADC) 80) and transmission of the output data to the data interface 70. The CPU 60 performs some other functions such as generating a pulse trigger signal that is forwarded to the optical emitter 20 for firing each light pulse. Synchronization trigger signal (in phase or shifted) is also sent to the MCOR 40 for starting the acquisition of the return signal waveforms. The CPU controls the acquisition by starting and stopping the waveform acquisition. The acquisition time is determined by the maximum range to be covered by the optical rangefinder 10.

The optical rangefinder 10 also includes means for supplying electrical power to the various subsystems depicted in FIG. 1. For clarity, these power supplies have not been shown in FIG. 1. Both optical emitter 20 and MCOR 40 will be described in further details in the next two sections.

The Optical Emitter

The optical emitter 20 radiates very brief light pulses, each having for example a duration of a few ns, and this duration sets a lower bound for the width (duration) of the signatures that could be present in the return signal waveforms generated at the output of the MCOR 40. When reliable discrimination between a pair of closely-spaced signatures in the signal waveforms is to be performed, the optical ranging should be carried out using light pulses of a duration which is as short as possible. Such pairs of signatures can be produced, for example, when two distinct objects are present within a given IFOV at the same moment, the objects being at slightly different distances from the rangefinder. Stated otherwise, using shorter light pulses enhances the range resolution of an optical ranging instrument based on the pulsed TOF principle. In practice, the shortest duration that can be achieved for the light pulses is limited by the impulse responses of both the driver electronics and the light source integrated in the optical emitter 20. The signatures in the return signal waveforms will be faithful replicas of the emitted light pulses provided that the overall detection bandwidth of the MCOR 40 is high enough, generally in the range of a few tens to a few hundreds MHz.

On the spectral side, the spectrum of the emitted light pulses lies for example in the near-infrared region of the electromagnetic spectrum. Some factors favor the use of near-infrared light such as the availability of affordable, compact optical sources and high-sensitivity photodetectors, the weaker response of the unaided human eye to near-infrared light, which makes the radiated light pulses non distracting, and the weaker solar irradiance background level in this spectral region as compared to the corresponding level in the visible wavelength region. Visible light can also be used for example when the need to illuminate the environment is required (global illumination or signaling information using light).

Operating an optical rangefinder at a light wavelength that coincides with a lower solar irradiance level promotes higher signal-to-noise ratios (SNR) for the signatures present in the return signal waveforms. In an example embodiment of the present invention, at least one high-power light-emitting diode (LED) unit is used to form the LED source 22 of the optical emitter 20. LED sources share several desirable features of semiconductor laser diodes emitting in the same spectral region since they are very compact, rugged, solid-state devices that can be driven at high repetition rate with electrical current pulses of a few ns duration. As noted earlier, this latter feature is useful for suitable range resolution to any optical ranging instrument based on the pulsed TOF principle. High-power LEDs are currently available for emission at various center wavelengths in the near-infrared spectral region. Longer near-infrared wavelengths, such as 940 nm for example, may be useful because of the steady decrease exhibited by the solar irradiance spectrum in this region. As compared to their laser diode counterparts, LEDs emit over a much wider wavelength band, which typically attains 10 to 50 nm depending on the selected LED material and its drive level.

The light emitted by LEDs has much lower temporal and spatial coherences than the light emitted by laser diode sources. Among other things, this means that the LED light impinging on an unprotected human eye and transmitted up to the eye retina will spread over a much larger spot on the retina. As a result, the light emitted from LEDs is much less hazardous than laser radiation of similar optical power level and wavelength in case of inadvertent ocular exposure events. In fact, the potential eye hazards that could result from exposure to the light emitted by LEDs are best assessed by performing hazard analyses based on the rules and guidelines given in safety standards intended for lamp devices. Thus, the safety standard now recommended when dealing with LED light is the International Standard IEC 62471 Photobiological safety of lamps and lamp systems, First Edition, (2006-07), published by the International Electrotechnical Commission. As compared to laser radiation in the near-infrared, the lower eye safety constraints of using LED light allows for illumination with pulses of higher optical energy, thus increasing the detection performance of a rangefinder instrument without requiring any change to its optical receiver. In particular, light pulses of higher optical energy result in optical return signals that better compete with any parasitic background light level captured by the MCOR 40.

The light emitted by the LED source 22 can be optically conditioned to be spread over a desired field of illumination (FOI) by using for example a collimating lens assembly 24 followed by an optical diffuser 26, as depicted in FIG. 1. The collimating lens assembly 24 could have a high input numerical aperture to promote better capture of the highly-diverging raw output light beam 28 emitted from the LED source 22. The lens assembly 24 redirects the captured light to form in its exit aperture plane a light irradiance distribution 30 having a transverse cross-section suited to the dimensions of the optical diffuser 26. Likewise, the lens assembly 24 reduces the divergence angle of the emitted light beam 28 to a few degrees to ensure that the specified optical diffusing characteristics of the diffuser 26 will be met. Upon its transmission through the optical diffuser 26, the light beam is converted into an asymmetric light cone 32 having an opening (divergence) angle that defines the FOI of the optical emitter 20. In addition to providing a FOI with a smooth, uniform light irradiance distribution, the use of an optical diffuser 26 facilitates the mounting of the LED source 22. The spatial characteristics of the light beam 32 exiting from the diffuser 26 are nearly insensitive to the exact disposition and alignment of the individual LED units integrated in the LED source 22. As a result, various FOIs can be obtained from the same LED source 22 simply by using optical diffusers 26 with different light diffusing characteristics. Holographic optical diffusers have peak optical transmissions which can reach 90% and even higher at the desired wavelength. Moreover, holographic light-shaping diffusers can be designed to spread the incoming light over a prescribed (asymmetric) FOI, which can have divergence angles that differ appreciably along both horizontal and vertical directions for best use in optical rangefinders intended for various applications. This type of optical diffuser is also appreciated for its nearly Gaussian-shaped, smooth output light irradiance distribution.

Other ways for optically conditioning the light beam 28 emitted from the LED source 22 can be envisioned without departing from the scope of the present invention. For example, a LED source 22 can be integrated in the optical emitter 20 without any collimating lens assembly 24 or optical diffuser 26 when the intended application requires flooding light 32 over very wide FOIs (for example 120° or wider) that are symmetrical along both orthogonal transverse directions. This cost-efficient approach is made possible due to the highly-diverging nature and smoothness of the raw output light emitted from LEDs. Furthermore, this approach allows for some tailoring of the resulting FOI by individually tuning the orientation of the center emission axis of each LED unit that forms part of the LED source 22. Alternatively, a lenticular lens sheet can substitute for the optical diffuser 26. Lenticular lens sheets generally consist of an extruded plastic sheet having one surface embossed with a set of linear tiny corrugations (called lenticules) running parallel to each other and acting as an array of magnifying lenses. Lenticular lenses are used for spreading light along a single transverse direction (perpendicular to the orientation of the lenticules), and can generate specific FOIs required by the intended applications. A LED reflector is also another possibility to shape the light at a very low cost.

Finally, the optical emitter 20 also includes electronics 34 for driving the LED source 22 with current pulses having peak amplitude and duration suitable for effective implementation of the pulsed TOF principle. As mentioned previously, a pulsed voltage trigger signal generated by the CPU 60 commands the generation of each current pulse by the LED driver electronics 34. For example, the optical pulses can be emitted with durations typically below 50 ns. Depending on the repetition rate at which the pulses are emitted, the duty cycle (relative ON time) of the optical emission can be as low as 0.1%. Driving the LED source 22 at low duty cycle allows for raising the peak current drive level at values that largely exceed the nominal current rating of the LED source 22 without compromising its lifetime. In order to get the desired peak optical output power for the radiated light pulses, any reduction of the peak drive level of the LEDs can be compensated for by mounting additional LED sources 22 in the optical emitter 20 and appropriately duplicating their drive electronics 34.

The optical emitter 20 may further benefit from the use of several LED sources 22 by performing individual alignment (optical boresighting) of each LED source 22 along a specific direction in such a way that the collective overlap of the radiated light beams results in a better filling (uniformity) of the FOI. This approach may provide a uniform FOI having the desired overall dimensions without the use of an optical diffuser 26.

The Multi-Channel Optical Receiver (MCOR)

Figure 2:
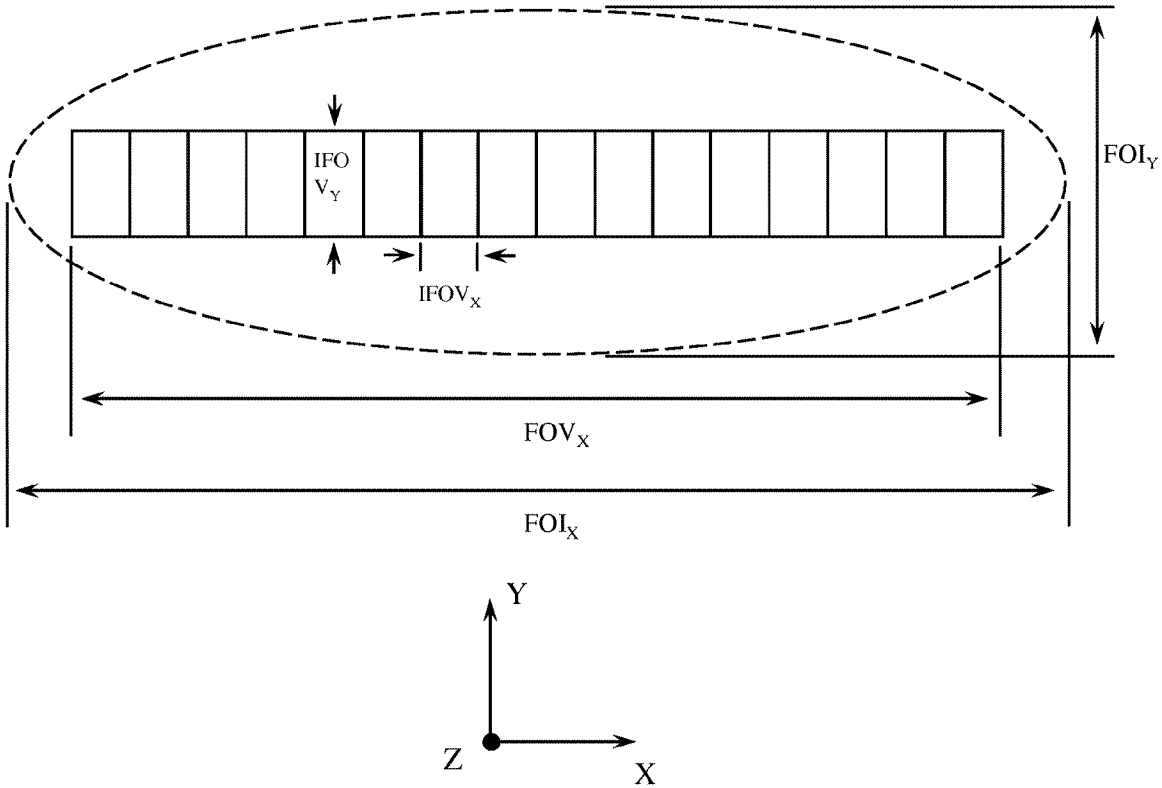
FIG. 2 depicts schematically an exemplary arrangement of 16 contiguous instantaneous fields of view (IFOVs) of an example multi-channel optical receiver.

The optical detection and ranging of objects located within an overall FOV composed of a 1×N linear arrangement of N smaller IFOVs extending along the horizontal direction is made possible with an optical receiver configuration 40 as shown in the schematic diagram of FIG. 1. In FIG. 1, the horizontal plane is set parallel to the plane of the page. The reference X axis, also shown in FIG. 1, is set horizontally along the direction perpendicular to the reference Z axis, the latter being parallel to the direction along which the optical axes of both optical emitter 20 and MCOR 40 point (i.e., parallel to the line of sight of the instrument 10). The Y axis, orthogonal to both X and Z axes, then points along the vertical direction. Referring temporarily to FIG. 2, a front view of an exemplary linear arrangement of 16 separate IFOVs is schematically illustrated. The set of IFOVs is disposed along the horizontal X direction. The whole field of view is enclosed within a field of illumination (FOI) generated by the optical emitter of the optical rangefinder instrument. In general, each individual IFOV has different extents along the X and Y axes since these extents are determined by the dimensions of the photosensitive surface of each photodetector. FIG. 2 shows a FOI having an elliptically-shaped outer contour (dashed line in FIG. 2) of sizeable eccentricity, namely with $FOI_X >> FOI_Y$, although various shapes can be envisioned for the FOI. The FOI is for example set wide enough to enclose the FOV of the MCOR 40 along both X and Y directions. FIG. 2 illustrates an example embodiment that allows sensing over a FOV having a wide extent ($FOV_X$) along the horizontal direction, the sensing being realized without the need for any mechanical scanning means. The required horizontal extent $FOV_X$ varies with the intended application. For example, in automotive applications, it can attain around 15° in systems for pre-crash mitigation, 40° for blind-spot detection, and 85° in systems for parking assistance. In transportation applications like stop bar detection, wider FOV is preferred for shorter intersection with several lanes, narrower FOV for longer intersection. In all cases, objects having low surface reflectance at the emission wavelength of the instrument 10 should be reliably detected and ranged over relatively short distances.

The linear 1×N arrangement of smaller IFOVs extending along the horizontal direction, as depicted in FIG. 2, should not be construed as limiting the scope of the invention since some specific applications may need a set of small IFOVs disposed along both horizontal and vertical directions to provide some type of two-dimensional (2D) angularly-resolved optical sensing. In fact, the expression "three-dimensional (3D) optical sensing" would be more appropriate in this situation due the ranging capability of the instrument that provides information about the location of any detected object along the third direction, parallel to the Z axis defined in the preceding paragraph. The arrangement of the IFOVs reflects the disposition of the set of photodetectors in the focal plane of the MCOR 40.

Referring back to FIG. 1, the optical return signal incident on the collecting aperture of the MCOR 40 first passes through an optical filter 42 (optional) that blocks the portion of the parasitic background light having its wavelength spectrum out of a limited wavelength band determined by the emission spectrum of the optical emitter 20. Optical interference filters are useful due to their spectral bandpasses having steep edges and high optical transmission. By contrast with the common practice when designing laser rangefinders operating with a narrow FOV, the bandpass of the optical filter 42 should be selected relatively wide, and in some circumstances it can be advisable to operate the MCOR 40 without any optical filter 42. The rationale for such a practice is twofold. As mentioned previously, the filter bandpass should be a bit wider than the emission spectrum of the optical emitter 20 to reduce the occurrence of rejection of the useful optical return signal incident on the collecting aperture. The second reason pertains to the well-known drift of the center wavelength of narrowband interference optical filters as the incidence angle of the incoming light increases. This phenomenon is especially troublesome for optical instruments that sense over wide FOVs that, in extreme situations, can cover up to 80° on either side of the normal incidence direction.

Figure 3:
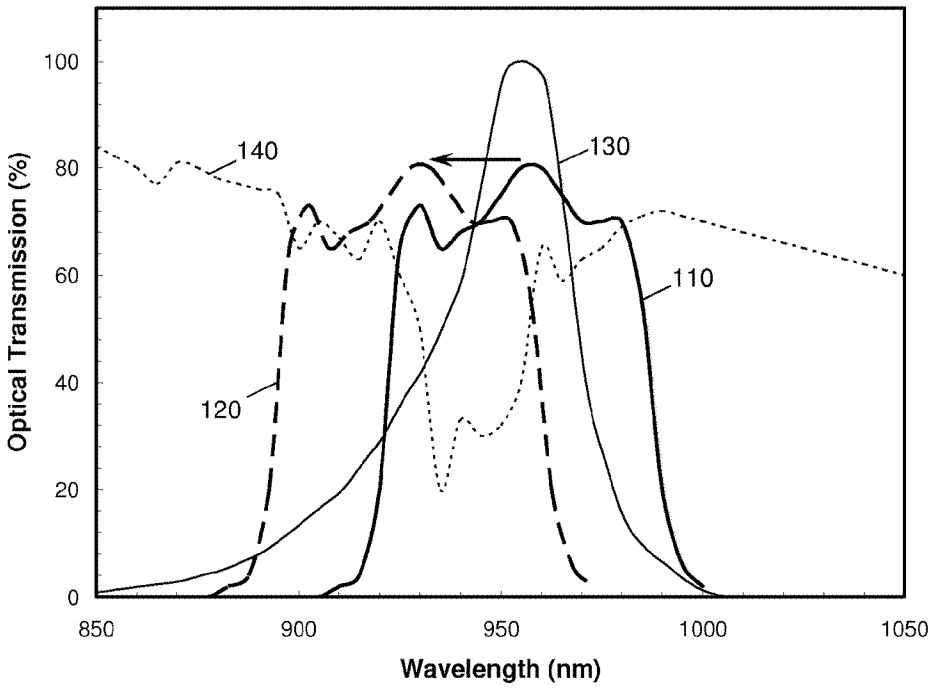
FIG. 3 is a graph that illustrates the drift of the center wavelength of the transmission bandpass of a typical optical interference filter as the incidence angle of the light impinging on the filter changes from 0° (normal incidence) to 30°.

For the sake of better illustrating this phenomenon, FIG. 3 is a graph that illustrates the shift towards shorter wavelengths of the transmission bandpass of an exemplary optical interference filter 42 having a relatively wide bandwidth of about 80 nm FWHM. It is apparent that the center wavelength of the bandpass drifts from about 960 nm for a 0° incidence angle (curve 110 depicted in thick solid line) to about 930 nm for a 30° incidence angle, as shown by the curve 120 depicted in dashed line. The drift observed as the incidence angle opens up to 30° then means that an increasing part of the spectrum of the optical return signal will be blocked by the optical filter 42 as this signal comes from objects located away from the center position of the FOV. The graph also shows the typical emission spectrum 130 of a 940-nm LED source depicted in thin solid line. In this example, the filter was chosen so that its bandpass for normal incidence is well matched to the LED emission spectrum. FIG. 3 also plots the curve 140 of the solar irradiance spectrum at sea level. A comparison of both solar irradiance and LED emission spectra illustrates an advantage of operating at an emission wavelength close to 940 nm since this wavelength region coincides with a sizeable dip in the solar irradiance spectrum. It is then necessary to widen the bandpass of the optical filter 42 to reduce the occurrence of any undesirable blocking of the optical return signal sensed over a wide FOV, with the unfortunate consequence of capturing more parasitic background light. This situation can impact on the selection of suitable photodetectors for integration in the MCOR 40.

In addition to the shift of their center wavelength with the incidence angle of the incoming light, the center wavelength of optical interference filters also shows some sensitivity to the ambient temperature.

For greater convenience, the optical filtering action can also be realized through the use of a commercially-available optical protection window having one of its faces coated with suitable optical films to block some parts of the optical wavelength spectrum. Alternatively, highly-resistant protection windows made from a material formulated to allow wavelength-selective optical transmission can be obtained from manufacturers such as Bayer AG Plastics Business Group (Leverkusen, Germany). For example, their lightweight Makrolon® polycarbonate material model 2405 with color formulation 450601 features high impact strength while effectively blocking light (nearly 0% transmittance) of wavelength lower than 700 nm.

Referring back to FIG. 1, the part of the optical return signal passing through the optical filter 42 is then transmitted through an objective 44 that focuses it onto the photosensitive surfaces of a series of photodetectors 46 disposed horizontally side-by-side in (or in close proximity of) the focal plane of the objective 44. The objective 44 may comprise a single lens element, as depicted schematically in FIG. 1, or it may be embodied as an optical assembly comprising several lens elements. Alternatively, the objective 44 can be built with minors or from a combination of minors and correcting lenses/plates, as it is found in catadioptric objective assemblies. Several factors may impact the design of the objective 44 such as the required f-number, its clear aperture diameter (which defines the collecting aperture of the MCOR 40), the level of correction required for the dominant optical aberrations, its compactness, ruggedness, and fabrication cost.

The staring linear array of photodetectors 46 comprises a plurality of individual photodetectors having for example identical characteristics. As stated previously, the photosensitive surface area of each photodetector determines its corresponding IFOV. By way of example, the commercially-available 16-element linear array of silicon (Si) PIN photodiodes model S8558 from Hamamatsu Photonics (Hamamatsu City, Japan) features photosensitive surface areas of 0.7 mm (horizontal) by 2.0 mm (vertical) when the array is set horizontally (with an element pitch at 0.8 mm). The IFOV associated to each individual photodetector has dimensions of 0.8° (H)×2.3° (V) when the linear array is coupled to an objective of 50-mm focal length. Accordingly, the 16-element linear array (including the gap) provides a full FOV of 14.5° (H)×2.3° (V), which is then mostly elongated along the horizontal direction. Other manufacturers offer linear arrays. For example, Advanced Photonix (Camarillo, Calif.) supplies the PDB-C216 which is a 16-element linear array in which the dimension of each element is 1.22 mm (H)×1.84 mm (V) and also supplies the PDB-C232 which is a 32-element linear array in which the dimension of each element is 0.89 mm (H) by 1.65 mm (V).

A two-dimensional photodetector array could also be used, for example when some angular resolution along the vertical direction is desired. For example, the 5×5 element SI PIN photodiode array number 57585 from Hamamatsu with an active area per element of 1.3 mm×1.3 mm (with an element pitch at 1.5 mm) can be used. When the application requires few FOVs, component S4204 from Hamamatsu is a dual-element photodiode, each element having an active area of 1 mm×2 mm. From Optek Technology, component OPR2101 is a 6-element photodiode array, each element having an active area of 0.72 mm×1.23 mm. Its configuration is 2×2 elements in the middle, one additional element on each side of the 2×2 matrix.

The example embodiment uses an array of PIN photodiodes in place of the more widely used APDs. Several reasons dictate this choice. The need for sensing over a wide FOV combined with the use of a LED-based optical emitter 20 prevents the use of a narrowband optical interference filter in the MCOR 40 for optical suppression of the parasitic background light. When operating the instrument during daytime, for example in bright sunlight conditions, an important solar background signal reaches the photodetectors 46 and competes with the useful optical return signal. In fact, the scene irradiance under bright sunlight can reach 1000 W/m$^2$. With an overcast sky, it can fall to approximately 100 W/m$^2$. These outdoor conditions are very different from artificially-illuminated indoor space where the irradiance is typically 5-30 W/m$^2$.

An example can be worked out to gain better insight about the solar background signal. Let us consider an optical receiver configuration comprising an objective of 20-mm clear aperture and having a focal length of 19.7 mm placed behind an optical filter having an 80-nm bandpass centered at the 940-nm wavelength, as suggested for sensing over wide FOVs. The optical power of the solar background signal within the optical filter bandwidth that is received on the photosensitive surface (here 0.7×2.0 mm$^2$) of a photodiode placed in the focal plane of the objective is estimated to range from about 80 nW to 800 nW as the angle between the line of sight of the optical receiver and the sun is reduced from 75° to 15° during clear-sky daytime conditions. In an extreme case, the estimated solar background signal would rise up to about 5 mW when direct sunlight is captured, i.e., when the line of sight of the instrument points right on the sun or when direct sunlight is deviated towards the instrument by a highly-reflecting flat surface.

The estimates given above were based on solar irradiance and clear-sky background radiance data at 940-nm wavelength retrieved from graphs and tables presented in D. Kryskowski and G. H. Suits, Natural Sources, Chapt. 3 of The infrared and electro-optical systems handbook Vol. 1, Sources of Radiation, (SPIE Press, Bellingham, Wash., 1993). Another way to evaluate the optical power of the solar background is explained by S. Donati in chapt. 3 of Electro-Optical Instrumentation: Sensing and Measuring with Lasers (Prentice Hall, 2004). By using the law of photography, and taking a worst case for the scene diffusivity, the result is much higher and reaches approximately 15 uW for the same sensor configuration (80-nm bandpass and a surface of 0.7×2.0 mm$^2$). If an optical filter or window made from a material formulated to allow wavelength-selective optical transmission above 700 nm is used (instead of using an 80-nm bandpass filter), the level of the background can be increased by a factor 10 (up to 8 uW to 150 uW). If there is no optical filter, the level of the background can increase by a factor 16 (up to 13 uW to 240 uW). These intense solar/daylight background contributions would command significant reductions of the internal gain value set to an array of APDs, whereas they can be handled by PIN photodiodes.

Typically, a PIN photodiode with a relatively large active area (for example greater than or equal to 0.5 mm$^2$) has a reverse saturation current (Is) high enough to avoid saturation from this background illumination. The Is parameter can be 10 to 40 times higher than the APD in continuous operation. This large saturation current permits to detect very weak pulse signal in a very high ambient light. Indeed, tests have shown that, in most circumstances, the internal gain of APDs integrated in devices for outdoor use cannot be set higher than about 20 during daytime to avoid overload of the photodiodes or saturation of the detection electronics. In these conditions, operating APDs at low internal gain setting means that their unique performance characteristics are far from being fully exploited.

By contrast with PIN photodiodes, APDs operate under high bias voltages (varying typically between 100 V and 500 V) and their seamless stable operation in adverse outdoor conditions calls for means for stabilizing their junction temperature, which then impacts negatively on the cost of an instrument integrating this type of photodetectors. In addition, the circuit that generates the bias voltage should be temperature stabilized due to the fact that APDs operated in linear regime are biased very close to their breakdown voltage, thus adding further to the cost of APD assemblies. The temperature dependence of APDs and of their related circuitry is discussed for example in U.S. Pat. No. 6,894,266. When fabricated in the form of linear arrays, the high bias voltage of APDs also means that a spacing (gap) should be created between consecutive photodiodes in the array. By way of example, each photodiode of the 16-element linear APD array model AA16-9 DIL18 available from Silicon Sensor GmbH (Berlin, Germany) features a photosensitive surface area of about 0.21 mm (H)×0.65 mm (V), with a non sensitive gap of 0.11 mm (H) that separates consecutive photodetectors. Operating such an APD array in the focal plane of a 50-mm objective then results in the presence of a blind zone covering 0.13° (along the horizontal) between each adjacent pair of IFOVs. This horizontal extent of the blind zones may seem rather low at first sight, but it should be noted that each IFOV for this specific design covers a horizontal extent of 0.24°. Stated otherwise, in this example about 35% of the horizontal extent of the whole FOV consists of blind zones in which objects would remain undetected.

Another problem encountered with linear arrays of APDs is the lack of uniformity of the optical detection performance parameters from photoelement to photoelement in the array. For example, the optical responsivity of each individual photodetector often varies within the array, and it is generally not possible or feasible to compensate for these variations since a single voltage source serves to collectively bias all of the photodetectors. Finally, the operation of APDs and of their related electronics is sensitive to external perturbations of various natures, so that these devices need more aggressive protection and shielding.

As compared to their APD counterparts, linear arrays of PINs are still far less expensive, thus favoring their integration in low-cost optical instruments intended for widespread use for several applications notably in mid or low-priced car vehicles. In addition, PIN photodiodes can be integrated with other technologies, as reported in U.S. Pat. No. 7,830,442. This means that linear arrays of PIN photodiodes (or 2D array) can be mounted with other semiconductor devices on a single die fabricated using various technologies, thus leading to highly-integrated, very compact, low-noise and economical multi-channel optical detection subassemblies. A Silicon-On-Insulator (SOI) CMOS process can be used to produce PIN photodiodes. Hybrid technology can also be used to integrate the PIN photodiode with a Read Out Integrated Circuit (ROIC). Typically, in that case, a Si-PIN array will be integrated with the ROIC die in a standard IC packaging. The ROIC converts the photocurrents from the PIN array into voltages for the digitization and for the processing. The ROIC can integrate several Analog-to-Digital Converters (ADC) for parallel acquisition.

Linear arrays of PIN photodiodes are available with photosensitive surface areas much larger than what can be obtained with linear arrays of APDs of comparable cost. For optical ranging over wide FOVs, using photodetectors of a larger format is highly desirable since a given FOV can be covered by placing an objective 44 of longer focal length in front of the photodetectors. Since the need for keeping the optical aberrations manageable sets a lower limit to the f-number of the objective, the possibility of selecting a longer focal length for the objective 44 then implies a higher clear aperture diameter for this component. As a result, selecting PIN photodiodes of a larger format (for example, having an active area greater than or equal to 0.5 $mm^2$) allows for capturing more optical return energy incident on the collecting aperture of the MCOR 40 for fixed values of the FOV and of the objective f-number. PIN photodiodes then favor higher optical collection efficiency for the MCOR 40, which can balance, at least partially, their lower sensitivity as compared to APD photodiodes. In other words, the lack of an internal gain mechanism in PIN photodiodes can be balanced by an optical gain resulting from the use of a wider collecting aperture.

Also, the stability of the photo sensitivity of the PIN array is useful when a reflection on the window of the enclosure of the emitter is used as a reference signal. This signal will be more stable independently of the background level and can be useful to indicate the position of the window (reference distance) and the level of dust/dirt on the window (amplitude of this reflection).

Referring back to FIG. 1, the MCOR 40 of an example embodiment of the optical ranging instrument 10 also includes multi-channel analog front end electronics 48 for conditioning of the raw electrical current waveforms at the outputs of the linear array 46 of PIN photodiodes. As it will be apparent to those skilled in the art, exemplary analog front end electronics 48 may consist of low-noise trans-impedance amplifiers, high-bandwidth amplifier stages, and low-voltage circuitry for biasing the linear array 46 of PIN photodiodes. Typically, the reverse voltage for biasing the PIN photodiode is less than 50 V. Using a photodiode array with a relatively large active area element generally requires to set the reverse voltage (Vr) close to the maximum rating value. In fact, using a photodiode with a large active area increases the junction capacitance (Cj) and has an impact in terms of bandwidth (the photodiode response time is slower). Using a high Vr improves the cut-off frequency. These components are replicated in a parallel arrangement to provide multi-channel detection electronics 48 in which each individual channel connects to a corresponding PIN photodiode of the linear array 46. As discussed previously, the PIN linear array 46 and the multi-channel analog front end electronics 48 can share the same printed-circuit board, and they can be integrated for example in the form of an application-specific integrated circuit (ASIC).

As shown in FIG. 1, the analog outputs of the front end electronics 48 are forwarded to a multi-channel analog-to-digital converter (ADC) board 80 that digitizes the analog voltage waveforms. Digitization at rates of several tens to hundreds of megasamples per second for each detection channel provides adequate distance resolution to help reduce the occurrence of wash out of the signatures that could be present in the return signal waveforms. It can be noted that the duration of the signatures remains nearly the same since the instrument 10 senses objects present within the FOV. This means that the sampling frequency of the ADC board 80 can be selected high enough to sample each signature with a convenient number of sampling points. The acquisition process can also use shifting techniques to decrease the sampling frequency of the ADC 80. Some of these shifting techniques are described in U.S. patent application publication No. 2010/277,713.

Signatures with very low peak amplitudes can be detected with a PIN-based optical detection configuration as described in the preceding paragraph. For example, the noise floor of a PIN photodiode connected to suitable analog detection electronics can be evaluated by first assuming return signal waveforms that contain signatures of about 20-ns duration FWHM, and that are amplified with analog electronics having a matched bandwidth of 50 MHz. PIN photodiodes are available with typical peak sensitivity of about 0.7 A/W and their noise contribution is negligible with respect to that of the front end analog electronics. For example, the MAX3806 high-gain linear preamplifier developed for optical ranging applications and manufactured by Maxim Integrated Products (Sunnyvale, Calif.) features a typical noise floor density of 1.5 $pA/Hz^{1/2}$. When expressed in units of optical power, the noise floor of this analog electronics is about 15 nW over the 50-MHz detection bandwidth. This noise floor contribution on the return signal waveforms can be reduced down to about 0.5 nW by averaging a set of 1024 successive return signal waveforms. This example then shows that useful signatures that carry peak optical powers of only a few nW could be detected with suitable SNRs. These peak optical powers for the useful signatures are found to be much lower than the typical background light contribution captured during daytime, (several tens to hundreds of uW as shown previously), but this background DC contribution can be eliminated from the return signal waveforms by operating the front end analog electronics in AC coupling mode.

Although the use of multi-channel analog front end electronics 48 and ADC board 80 provides better performance and data transmission efficiency, the conditioning and transmission of the return signal waveforms from the PIN linear array 46 up to the CPU 60 can also be realized through single-channel electronics and digital conversion without departing from the scope of the present invention. In this alternative embodiment, the N outputs of the PIN linear array 46 would be interrogated in sequence (time multiplexing) and then amplified by a single-channel analog amplifier chain prior to transmitting serially the set of return signal waveforms to a single-channel ADC 80 for conversion into digital format. This single-channel embodiment for the analog front end electronics 48 and ADC 80 is more economical than its multi-channel counterpart, but generates the emission of N successive light pulses from the optical emitter 20 for each complete interrogation cycle of the PIN linear array 46. The optical emitter 20 can be designed for firing light pulses at repetition rates of several tens to hundreds of kHz. The duration of the interrogation cycles can then be kept short enough for enabling optical sensing in real-time.

Figure 4:
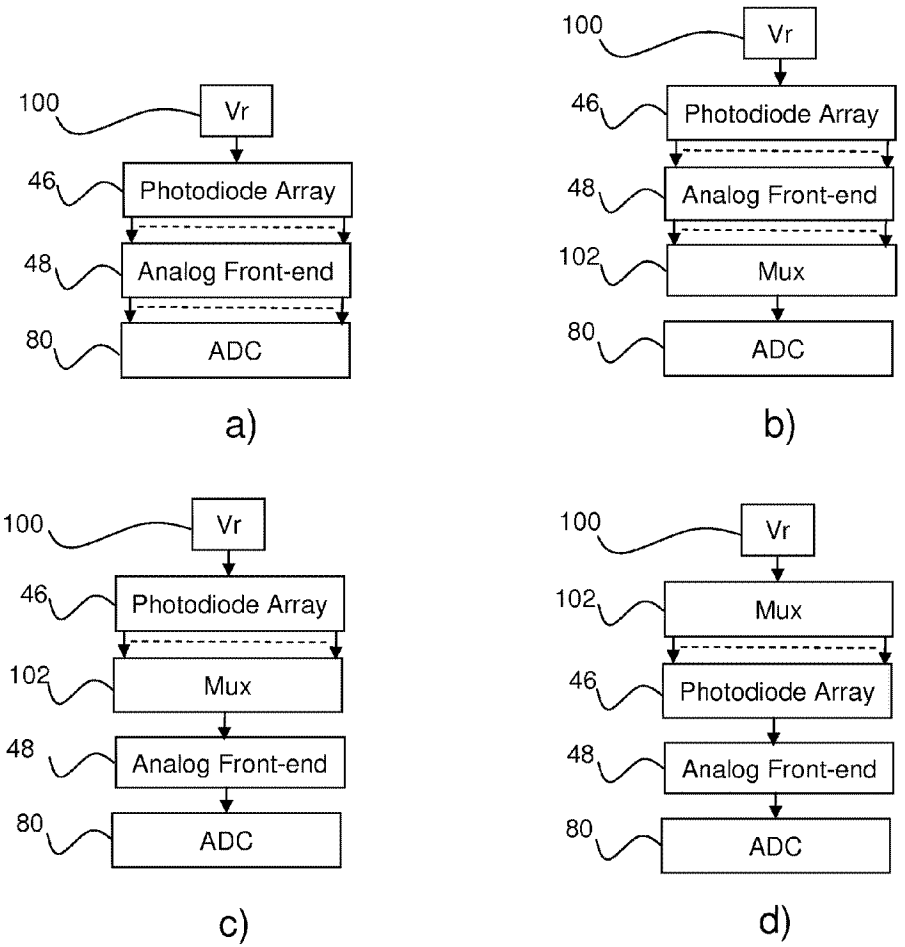
FIG. 4A, FIG. 4B, FIG. 4C and FIG. 4D show four different configurations of the multi-channel analog front end and digital acquisition.

FIG. 4 shows four different embodiments of the multi-channel analog front end and digital acquisition. FIG. 4A shows a Photodiode Array (N elements) with a reverse bias voltage Vr 100. Typically, Photodiode Array 46 has a common pin (anode or cathode) supplied by the Vr 100. Each element (channel) of the Photodiode Array 46 is conditioned by the Analog Front-end 48 and digitalized by the ADC 80 in parallel. Signals from each element of the Photodiode Array 46 can be AC coupled (all the DC level from the background illumination is rejected) or DC coupled. FIG. 4B inserts a multiplexer, Mux 102, controlled by the Control and processing unit (not shown) to minimize the number of ADC channels (at least one channel). FIG. 4C shows a configuration using a MUX 102 between the Photodiode Array 46 and the Analog Front end 48. The number of Analog Front-end channels can be decreased to one thus reducing the number of components in the Analog front-end. The Mux 102 is placed in a very sensitive area and the "ON" resistance and channel input and output capacitance should be low. Parasitic capacitance can limit the bandwidth. FIG. 4D shows a configuration with a Mux 102 placed between the reverse bias voltage Vr 100 and the Photodiode Array 46.

This configuration is less sensitive to capacitance of the multiplexer but should operate with the level of the reverse bias voltage.

The Control and Processing Unit (CPU)

The set of time-series numerical data streams at the output of the ADC board 80, i.e., the set of digitized return signal waveforms, is forwarded to the CPU 60 for further processing. The heart of the CPU 60 is for example a microprocessor assembly suited for embarked applications and capable of performing parallel processing with the required number of channels. CPU 60 can also revolve around other types of processing means such as a FPGA (Field-Programmable Gate Array), a DSP (Digital Signal Processor) or other programmable logics. The nature and extent of the numerical processing depend on the intended application. The CPU 60 can then communicate the output data to a higher-level system in which the optical rangefinder 10 can be integrated via a data interface 70 that operates under exemplary data communication interfaces such as Ethernet, USB or CAN-bus.

Numerical Processing of the Recorded Signal Waveforms

The optical rangefinder instrument 10 can be considered to be a full waveform LIDAR (LIght Detection And Ranging) instrument since it can output a set of digitized return signal waveforms acquired during a suitable time interval dictated by the maximum range at which objects are to be detected and ranged. As compared to classical analog-type optical rangefinders which range objects by stopping an electronic counter as soon as a detected peak exceeds a predetermined threshold, full-waveform instruments provide greater flexibility by allowing a host of numerical processing tasks to be done on the recorded digital waveforms.

For example, the signal-to-noise ratio (SNR) of the signatures possibly present in the return signal waveforms associated to any given detection channel can be enhanced by averaging a number of successive waveforms acquired by the channel. The better SNRs obtained by standard signal averaging (accumulation) are possible provided that the noise contributions present in the successive waveforms are independent from each other and fully uncorrelated. When this condition is satisfied, which is often the case after proper elimination of the fixed pattern noise contributions, the SNR of the waveforms can be increased by a factor of $(n_W)^{1/2}$, where $n_W$ is the number of averaged waveforms. Another condition that limits the number of waveforms to be averaged is the need for stationarity of the processes that generate the signatures. Stated otherwise, the properties (peak amplitude, shape, time/distance location) of the signatures present in the waveforms should remain unchanged during the time period required to record a complete set of waveforms that will be averaged. This condition may be difficult to respect when attempting to detect objects that move rapidly with respect to the optical rangefinder 10. The signatures associated to moving objects drift more or less appreciably from waveform to waveform. Although this situation frequently occurs in the applications to which to optical rangefinder 10 described herein is intended, its detrimental impacts can be alleviated by selecting the pulse repetition rate of the optical emitter 20 high enough, for example in the kHz range. Operating at high repetition rates enables the capture of numerous return signal waveforms during a time interval short enough to prevent noticeable drifts of the signatures associated to a given moving object. Another way of dealing with moving objects is to implement sophisticated numerical processing of the return signal waveforms specifically aimed at enhancing the SNR of signatures from moving objects. Such methods of numerical processing are taught for example in U.S. Pat. No. 7,640,122.

The waveform averaging can be implemented in the form of mobile averaging, wherein the current average waveform is continuously updated by summing it with a newly-acquired waveform while subtracting from the average the waveform that was first acquired. Using mobile averages does not impact on the rate at which the output detection data is generated by the CPU. Moreover, a timely detection of any object appearing suddenly in the FOV of the optical ranging instrument 10 can be enabled by resetting the mobile average when a newly-acquired waveform presents at least one feature that differs appreciably from the current average waveform.

While the example embodiments of the invention in their various aspects have been described above, such descriptions are to be taken as illustrative of embodiments of the invention rather than descriptions of the intended scope of the invention. Accordingly, the scope of the invention should not be construed as being limited to driver assistance/safety systems embarked in vehicles. The optical rangefinder instrument of the present invention can thus be integrated in fixed systems dedicated to traffic monitoring, for example at road intersections where various types of objects (vehicles, bicycles, pedestrians, pavement) should be reliably detected over wide fields of view in various weather conditions and under widely-varying lighting conditions occurring from both natural and artificial sources. It can also be integrated in a mobile application such as in driver assistance applications in the automotive field of industry.

I claim:

[1. A multiple-field-of-view scannerless optical rangefinder operating in pulsed Time-Of-Flight operation for use in high ambient background light, the rangefinder comprising:

an optical emitter for emitting a train of light pulses, said train of light pulses having a broad field-of-illumination (FOI), said optical emitter having a LED light source and driver electronics;

a multi-channel optical receiver (MCOR) for detecting optical return signals, said MCOR including an array of PIN photodiodes, each detection channel of said multi-channel optical receiver having a photodetector with a photosensitive surface, an instantaneous field of view of each said detection channel having a horizontal and a vertical extent determined by dimensions of each respective said photosensitive surface and being adapted to output a channel return signal waveform, an overall field-of-view (FOV) of said multi-channel optical receiver encompassing each said instantaneous field of view, said field-of-illumination encompassing said over-all field-of-view, said multi-channel optical receiver having analog front-end electronics for conditioning said channel return signal waveforms, said MCOR outputting conditioned channel return signal waveforms;

an Analog-to-Digital Converter (ADC) for receiving and converting said conditioned channel return signal waveforms from said MCOR into digital format;

a control and processing unit (CPU) operatively connected to said optical emitter, said MCOR and said ADC, for generating a pulse trigger signal to trigger said optical emitter into emitting said train of pulses, for sending a synchronization trigger signal to said MCOR for starting said detection of said optical return signals, and for processing said conditioned channel return signal waveforms in digital format;

a data interface for receiving processed channel return signal waveforms from said CPU and preparing output data;

wherein a peak present in any of said optical return signal waveforms is a signature of an object located within said instantaneous field of view.]

[2. The rangefinder as claimed in claim 1, wherein said pulses have a duration below 50 ns and a detection bandwidth of said MCOR is higher than 10 MHz.]

[3. The rangefinder as claimed in claim 1, wherein said LED light source includes a plurality of LED sources.]

[4. The rangefinder as claimed in claim 1, wherein said light pulses are in one of a near-infrared region and a visible region of electromagnetic spectrum.]

[5. The rangefinder as claimed in claim 1, wherein said optical emitter further comprises at least one of a collimating lens assembly, a lenticular lens sheet, a LED reflector and an optical diffuser to condition said light pulses emitted by said LED light source.]

[6. The rangefinder as claimed in claim 1, wherein said photosensitive surface has an area of at least 0.5 $mm^2$.]

[7. The rangefinder as claimed in claim 1, wherein said photosensitive surface has a reverse saturation current greater than 1 mA.]

[8. The rangefinder as claimed in claim 1, wherein said MOOR further comprises an objective having at least one of at least one lens element, at least one mirror and at least one correcting plate, said objective for focusing said optical return signal onto said photosensitive surfaces of said photodetectors.]

[9. The rangefinder as claimed in claim 1, wherein said analog front-end electronics being at least one of parallel multi-channel and multi-channel time-multiplexed.]

[10. The rangefinder as claimed in claim 1, wherein Analog-to-Digital Converter (ADC) includes more than one converter units adapted to work together to receive and convert said conditioned channel return signal waveforms into digital format.]

[11. The rangefinder as claimed in claim 1, wherein said MCOR is composed of one of a linear arrangement of N detection channels extending along a first direction and a two-dimensional arrangement of M X N detection channels extending along both said first direction and an orthogonal direction, said orthogonal direction being orthogonal to said first direction.]

[12. The rangefinder as claimed in claim 1, wherein said detection channels are AC coupled.]

[13. The rangefinder as claimed in claim 1, further comprising an optical filter for blocking at least a portion of parasitic background light having a wavelength spectrum outside of a wavelength band of said optical emitter.]

[14. The rangefinder as claimed in claim 1, wherein said LED emitter, said multi-channel optical receiver, said analog-to-digital converter and said control and processing unit are provided in an enclosure with a light transmission window for said LED emitter and said multi-channel optical receiver.]

[15. The rangefinder as claimed in claim 14, wherein said rangefinder further comprising an optical filter provided on said window for blocking at least a portion of parasitic background light having a wavelength spectrum outside of a wavelength band of said optical emitter.]

[16. The rangefinder as claimed in claim 15, wherein said optical filter is one of an optical protection window having one face coated with an optical film and a protection window made from a material allowing wavelength-selective optical transmission.]

[17. The rangefinder as claimed in claim 1, wherein said MCOR is provided on an integrated circuit.]

[18. The rangefinder as claimed in claim 1, wherein said a scene spectral irradiance of said high ambient background light is higher than 50 $W/m^2$ .]

[19. The rangefinder as claimed in claim 1, wherein said overall field-of-view has a minimum overall extent of 10° by 1°.]

[20. The rangefinder as claimed in claim 1, further comprising a distance calculator for calculating a distance between said rangefinder and said object, said distance calculator obtaining at least one of temporal and spatial characteristics of said light pulses and using said characteristics and said conditioned channel return signal waveforms in digital format to calculate said distance.]

[21. The rangefinder as claimed in claim 20, wherein said distance calculator is a component of said control and processing unit and wherein said output data includes said distance.]

[22. The rangefinder as claimed in claim 1, wherein said object is one of a vehicle, a person, an animal, a gas, a liquid, a particle, a pavement, a wall, a post, a sidewalk, a ground surface and a tree.]

*23. A scannerless optical rangefinder, comprising:*

*a. an optical emitter for emitting an optical interrogation signal distributed over a field of illumination;*

*b. a multi-channel optical receiver (MCOR), for detecting an optical return signal over a field of view that is encompassed in the field of illumination and providing a return signal waveform;*

*c. an analog-to-digital converter (ADC) for receiving and converting a return signal waveform from the MCOR into digital format;*

*d. a control and processing unit (CPU) operatively connected to said optical emitter and said MCOR, for controlling emission of the optical interrogation signal and for processing the digital waveform output from the ADC to detect objects within the field of view;*

*the MCOR including a blind zone free array of photoresponsive elements, each photoresponsive elements characterized by a dimensionality and a saturation level selected so as to enable detection by the CPU of an object in the field of view when that object generates a contribution to the optical return signal that has a peak power of 0.5 to 15 nanowatts in the presence of a solar background contribution to the optical return signal of 80 to 800 nanowatts in a pass band of 80-nm and centered at 940-nm.*

*24. A scannerless optical rangefinder as defined in claim 23, said FOI being configured such that the optical return signal is received by two or more of the photoresponsive elements of the array.*

*25. A scannerless optical rangefinder as defined in claim 24, wherein said FOI encompasses said FOV.*

*26. A scannerless optical rangefinder as defined in claim 23, wherein said optical emitter outputs LED light.*

*27. A scannerless optical rangefinder as defined in claim 26, wherein said optical emitter includes a plurality of light sources.*

*28. A scannerless optical rangefinder as defined in claim 26, wherein said optical emitter includes a light emitting diode (LED).*

*29. A scannerless optical rangefinder as defined in claim 23, wherein said optical emitter generates pulsed light.*

*30. A scannerless optical rangefinder as defined in claim 29, wherein said pulsed light has pulses of a duration that is less than 50 ns.*

*31. A scannerless optical rangefinder as defined in claim 23, wherein said MCOR has a detection bandwidth higher than 10 MHz.*

*32. A scannerless optical rangefinder as defined in claim 23, wherein said optical emitter emits light in a near-infrared region of the electromagnetic spectrum.*

*33. A scannerless optical rangefinder as defined in claim 23, further comprising a device to condition light output by said optical emitter.*

*34. A scannerless optical rangefinder as defined in claim 33, wherein said device to condition light output by said optical emitter includes at least one of a collimating lens, a lenticular lens sheet, a light emitting diode (LED) reflector and optical diffuser.*

*35. A scannerless optical rangefinder as defined in claim 23, comprising a device for focusing the optical return on photosensitive surfaces of respective photoresponsive elements.*

*36. A scannerless optical rangefinder as defined in claim 23, wherein said array includes a linear arrangement of N photoresponsive elements.*

*37. A scannerless optical rangefinder as defined in claim 23, wherein said array includes a two dimensional arrangement of N X M photoresponsive elements.*

*38. A scannerless optical rangefinder as defined in claim 23, including a filter to block parasitic background light outside of a wavelength band of the optical emitter.*

*39. A scannerless optical rangefinder as defined in claim 23, including a calculator to compute a distance between the rangefinder and an object by using as an input the optical return signal or a signal derived therefrom.*

*40. A scannerless optical rangefinder as defined in claim 23, wherein the CPU is configured to enhance the SNR of the digital waveform.*

*41. A scannerless optical rangefinder as defined in claim 23, the MCOR further including an analog front end configured to operate in AC coupling mode.*

*42. A scannerless optical rangefinder as defined in claim 41, wherein to detect the object, the CPU is configured to average the digital waveform over time.*

*43. A scannerless optical rangefinder as defined in claim 23, wherein to detect the object, the CPU is configured to average the digital waveform over time.*

* * * * *